US009577449B2

(12) United States Patent
Hoover

(10) Patent No.: US 9,577,449 B2
(45) Date of Patent: Feb. 21, 2017

(54) METHOD AND APPARATUS TO ALIGN WIRELESS CHARGING COILS

(71) Applicant: Andrew R. Hoover, West Liberty, OH (US)

(72) Inventor: Andrew R. Hoover, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 14/158,060

(22) Filed: Jan. 17, 2014

(65) Prior Publication Data

US 2015/0204928 A1 Jul. 23, 2015

(51) Int. Cl.
*H02J 7/00* (2006.01)
*H02J 7/02* (2016.01)

(52) U.S. Cl.
CPC ............... *H02J 7/0042* (2013.01); *H02J 7/025* (2013.01)

(58) Field of Classification Search
CPC .................................................... H02J 7/0042
USPC ......................................................... 320/108
See application file for complete search history.

(56) References Cited

U.S. PATENT DOCUMENTS

| 5,654,621 | A | 8/1997 | Seelig |
|---|---|---|---|
| 5,703,461 | A | 12/1997 | Minoshima |
| 7,352,567 | B2 | 4/2008 | Hotelling |
| 7,715,187 | B2 | 5/2010 | Hotelling |
| 7,741,734 | B2 | 6/2010 | Joannopoulos |
| 7,825,543 | B2 | 11/2010 | Karalis |
| 7,916,467 | B2 | 3/2011 | Hotelling |
| D636,333 | S | 4/2011 | Kulikowski |
| 8,010,205 | B2 | 8/2011 | Rahman |
| 8,022,576 | B2 | 9/2011 | Joannopoulos |
| 8,035,255 | B2 | 10/2011 | Kurs |
| 8,076,800 | B2 | 12/2011 | Joannopoulos |
| 8,076,801 | B2 | 12/2011 | Karalis |
| 8,084,889 | B2 | 12/2011 | Joannopoulos |
| 8,097,983 | B2 | 1/2012 | Karalis |
| 8,106,539 | B2 | 1/2012 | Schatz |
| 8,115,448 | B2 | 2/2012 | John |
| 8,242,741 | B2 | 8/2012 | Phelps |
| 8,304,935 | B2 | 11/2012 | Karalis |
| 8,400,017 | B2 | 3/2013 | Kurs et al. |
| 8,400,018 | B2 | 3/2013 | Joannopoulos |
| 8,400,019 | B2 | 3/2013 | Joannopoulos |
| 8,400,020 | B2 | 3/2013 | Joannopoulos |

(Continued)

FOREIGN PATENT DOCUMENTS

| AU | 2006269374 B2 | 1/2007 |
|---|---|---|
| AU | 2007349874 B2 | 10/2008 |

(Continued)

*Primary Examiner* — Thuan Do
(74) *Attorney, Agent, or Firm* — Armstrong Teasdale LLP

(57) ABSTRACT

A wireless charging device for use in providing electrical power to one or more portable electronic devices is provided. The wireless charging device includes a transmission coil coupled to an electrical power source. The transmission coil selectively transmits power from the electrical power source to at least one receiving coil in a first portable electronic device of the one or more portable electronic devices. The wireless charging device also includes a positioning system coupled to the transmission coil. The positioning system is configured to selectively rotate said transmission coil about a first axis and about a second axis.

20 Claims, 7 Drawing Sheets

(56) References Cited

U.S. PATENT DOCUMENTS

| | | |
|---|---|---|
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 2008/0278264 A1 | 11/2008 | Karalis |
| 2009/0267710 A1 | 10/2009 | Joannopoulos |
| 2010/0096934 A1 | 4/2010 | Joannopoulos |
| 2010/0102639 A1 | 4/2010 | Joannopoulos |
| 2010/0102640 A1 | 4/2010 | Joannopoulos |
| 2010/0102641 A1 | 4/2010 | Joannopoulos |
| 2010/0117455 A1 | 5/2010 | Joannopoulos |
| 2010/0117456 A1 | 5/2010 | Karalis |
| 2010/0123353 A1 | 5/2010 | Joannopoulos |
| 2010/0123354 A1 | 5/2010 | Joannopoulos |
| 2010/0123355 A1 | 5/2010 | Joannopoulos |
| 2010/0127573 A1 | 5/2010 | Joannopoulos |
| 2010/0127574 A1 | 5/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0141042 A1 | 6/2010 | Kesler |
| 2010/0148589 A1 | 6/2010 | Hamam |
| 2010/0164296 A1 | 7/2010 | Kurs |
| 2010/0164297 A1 | 7/2010 | Kurs |
| 2010/0164298 A1 | 7/2010 | Karalis |
| 2010/0171368 A1 | 7/2010 | Schatz |
| 2010/0171370 A1 | 7/2010 | Karalis |
| 2010/0181844 A1 | 7/2010 | Karalis |
| 2010/0181845 A1 | 7/2010 | Fiorello |
| 2010/0187911 A1 | 7/2010 | Joannopoulos |
| 2010/0201203 A1 | 8/2010 | Schatz |
| 2010/0201205 A1 | 8/2010 | Karalis |
| 2010/0207458 A1 | 8/2010 | Joannopoulos |
| 2010/0219694 A1 | 9/2010 | Kurs |
| 2010/0225175 A1 | 9/2010 | Karalis |
| 2010/0231053 A1 | 9/2010 | Karalis |
| 2010/0231340 A1 | 9/2010 | Fiorello |
| 2010/0237706 A1 | 9/2010 | Karalis |
| 2010/0237707 A1 | 9/2010 | Karalis |
| 2010/0237708 A1 | 9/2010 | Karalis |
| 2010/0237709 A1 | 9/2010 | Hall |
| 2010/0253152 A1 | 10/2010 | Karalis |
| 2010/0259108 A1 | 10/2010 | Giler |
| 2010/0259110 A1 | 10/2010 | Kurs |
| 2010/0264745 A1 | 10/2010 | Karalis |
| 2010/0264747 A1 | 10/2010 | Hall |
| 2010/0277005 A1 | 11/2010 | Karalis |
| 2010/0277121 A1 | 11/2010 | Hall |
| 2010/0308939 A1 | 12/2010 | Kurs |
| 2010/0327660 A1 | 12/2010 | Karalis |
| 2010/0327661 A1 | 12/2010 | Karalis |
| 2011/0012431 A1 | 1/2011 | Karalis |
| 2011/0018361 A1 | 1/2011 | Karalis |
| 2011/0043046 A1 | 2/2011 | Joannopoulos |
| 2011/0043047 A1 | 2/2011 | Karalis |
| 2011/0043048 A1 | 2/2011 | Karalis |
| 2011/0043049 A1 | 2/2011 | Karalis |
| 2011/0049998 A1 | 3/2011 | Karalis |
| 2011/0074218 A1 | 3/2011 | Karalis |
| 2011/0074344 A1 | 3/2011 | Park |
| 2011/0074346 A1 | 3/2011 | Hall |
| 2011/0074347 A1 | 3/2011 | Karalis |
| 2011/0089895 A1 | 4/2011 | Karalis |
| 2011/0095618 A1 | 4/2011 | Schatz |
| 2011/0121920 A1 | 5/2011 | Kurs |
| 2011/0140544 A1 | 6/2011 | Karalis |
| 2011/0162895 A1 | 7/2011 | Karalis |
| 2011/0169339 A1 | 7/2011 | Karalis |
| 2011/0193416 A1 | 8/2011 | Campanella |
| 2011/0193419 A1 | 8/2011 | Karalis |
| 2011/0198939 A1 | 8/2011 | Karalis |
| 2011/0204845 A1 | 8/2011 | Paparo |
| 2011/0221278 A1 | 9/2011 | Karalis |
| 2011/0221387 A1 | 9/2011 | Steigerwald |
| 2012/0032522 A1 | 2/2012 | Schatz |
| 2012/0062345 A1 | 3/2012 | Kurs |
| 2012/0068549 A1 | 3/2012 | Karalis |
| 2012/0086284 A1 | 4/2012 | Capanella |
| 2012/0086867 A1 | 4/2012 | Kesler |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |
| 2012/0119698 A1 | 5/2012 | Karalis |
| 2012/0139355 A1 | 6/2012 | Ganem |
| 2012/0153732 A1 | 6/2012 | Kurs |
| 2012/0153733 A1 | 6/2012 | Schatz |
| 2012/0153734 A1 | 6/2012 | Kurs |
| 2012/0153735 A1 | 6/2012 | Karalis |
| 2012/0153736 A1 | 6/2012 | Karalis |
| 2012/0153737 A1 | 6/2012 | Karalis |
| 2012/0153738 A1 | 6/2012 | Karalis |
| 2012/0319644 A1 | 12/2012 | Hu |
| 2012/0326659 A1 | 12/2012 | Shukuya |
| 2014/0070764 A1* | 3/2014 | Keeling .............. B60L 11/1833 320/108 |
| 2015/0022194 A1* | 1/2015 | Almalki ................ G01R 33/02 324/244 |

FOREIGN PATENT DOCUMENTS

| | | |
|---|---|---|
| AU | 2009246310 A1 | 11/2009 |
| AU | 2010200044 B2 | 1/2010 |
| CA | 2615123 A1 | 1/2007 |
| CA | 2682284 A1 | 10/2008 |
| CA | 2724341 A1 | 11/2009 |
| CN | 101682216 A | 3/2010 |
| CN | 101860089 A | 10/2010 |
| CN | 101258658 B | 11/2012 |
| CN | 102130473 B | 5/2013 |
| EP | 1902505 A2 | 3/2008 |
| EP | 2130287 A1 | 12/2009 |
| EP | 2281322 A1 | 2/2011 |
| EP | 2306615 A2 | 4/2011 |
| EP | 2306616 A2 | 4/2011 |
| EP | 2340611 A1 | 7/2011 |
| EP | 2345100 A1 | 7/2011 |
| EP | 2579420 A2 | 4/2013 |
| FR | 2971898 A1 | 8/2012 |
| HK | 1120933 A | 4/2009 |
| HK | 1139515 A | 9/2010 |
| IN | 200800735 P1 | 5/2008 |
| IN | 200906195 P1 | 7/2010 |
| IN | 201007357 P4 | 9/2011 |
| JP | 2011177018 A | 9/2011 |
| JP | 2012010551 A | 1/2012 |
| JP | 2012502602 A | 1/2012 |
| JP | 4921466 B2 | 4/2012 |
| KR | 2008031398 A | 4/2008 |
| KR | 20100015954 A | 2/2010 |
| KR | 2011014649 A | 2/2011 |
| KR | 2011074761 A | 7/2011 |
| KR | 1118710 B1 | 2/2012 |
| KR | 101136889 B1 | 4/2012 |
| WO | 2007008646 A2 | 1/2007 |
| WO | 2008118178 A1 | 10/2008 |
| WO | 2009140506 A1 | 11/2009 |
| WO | 2010036980 A1 | 4/2010 |
| WO | 2010039967 A1 | 4/2010 |

(56) References Cited

FOREIGN PATENT DOCUMENTS

| | | |
|---|---|---|
| WO | 2010093997 A1 | 8/2010 |
| WO | 2010150482 A1 | 12/2010 |
| WO | 2011112795 A1 | 9/2011 |
| WO | 2012007666 A2 | 1/2012 |
| WO | 2012037279 A1 | 3/2012 |
| WO | 2012047779 A1 | 4/2012 |

* cited by examiner

METHOD AND APPARATUS TO ALIGN WIRELESS CHARGING COILS

BACKGROUND

The present disclosure relates generally to wireless charging coils, and more particularly to methods and systems for using wireless charging coils with a wireless charging device.

Known portable electronic devices, e.g., without limitation, smartphones, tablets, netbooks, e-readers, PDAs, and other similar devices have become increasingly prevalent in modern society. Many such electronic devices are battery powered, such as by a lithium ion battery, in order to enable the electronic device to be operated while detached from a power source. However, known battery powered devices must be periodically recharged for continuous use, because batteries lose charge during operation of the electronic device. In known systems, recharging the electronic device may include attaching the battery of the electronic device to an electrical power source through a cable or wire. In more recently known systems, a wireless charging device charges the battery using inductive coils that do not require a direct physical connection. More specifically, known wireless charging devices transmit electrical power from a charging coil in the wireless charging device to a receiving coil in the electronic device.

However, as wireless charging efficiency is at least partially related to the orientation of the charging coil with respect to the receiving coil, known wireless charging systems require the electronic device to be precisely positioned with respect to a wireless charging device. Generally wireless charging becomes more efficient as the coils are oriented parallel to each other, and charging efficiency is reduced as the coils become oriented perpendicularly to each other. Therefore, in some known systems, the wireless charging device includes shelves or slots that receive the electronic device and orient the electronic device in a particular position to enable a static charging coil to operate efficiently. In other known systems, the wireless charging device includes a flat charging pad that includes a charging coil that may be movable within an X-Y plane defined by the flat charging pad.

However, each of the known systems requires at least some predetermined positioning of the electronic device, either by placing the device into a slot, or by positioning the device on a flat charging pad. Further, known systems rapidly lose charging efficiency as the electronic device is oriented at an increasing planar angle with respect to the wireless charging device.

BRIEF DESCRIPTION

In one aspect, a wireless charging device for use in providing electrical power to one or more portable electronic devices is provided. The wireless charging device includes a transmission coil coupled to an electrical power source. The transmission coil selectively transmits power from the electrical power source to at least one receiving coil in a first portable electronic device of the one or more portable electronic devices. The wireless charging device also includes a positioning system coupled to the transmission coil. The positioning system is configured to selectively rotate said transmission coil about a first axis and about a second axis.

In another aspect, a wireless charging system is provided. The wireless charging system includes one or more portable electronic devices. A first portable electronic device of the one or more portable electronic devices includes at least one receiving coil and a battery. The wireless charging system also includes a wireless charging device configured to be coupled to an electrical power source and comprising a transmission coil configured to be inductively coupled to the at least one receiving coil. The wireless charging system also includes a positioning system coupled to at least one of the transmission coil and the at least one receiving coil. The positioning system is configured to selectively rotate at least one of the transmission coil and the at least one receiving coil about a first axis and about a second axis.

In another aspect, a method for transferring power between a wireless charging device and one or more portable electronic devices is provided. The method includes receiving electrical power from an electrical power source at a transmission coil in the wireless charging device. The method also includes rotating, with a positioning system, at least one of the transmission coil and a receiving coil of a first portable electronic device of the one or more portable electronic devices. The positioning system rotates the at least one of the transmission coil and the receiving coil by selectively rotating at least one of the transmission coil and the receiving coil about a first axis, and selectively rotating at least one of the transmission coil and the receiving coil about a second axis.

The features, functions, and advantages described herein may be achieved independently in various embodiments of the present disclosure or may be combined in yet other embodiments, further details of which may be seen with reference to the following description and drawings.

DETAILED DESCRIPTION

Figure 1:
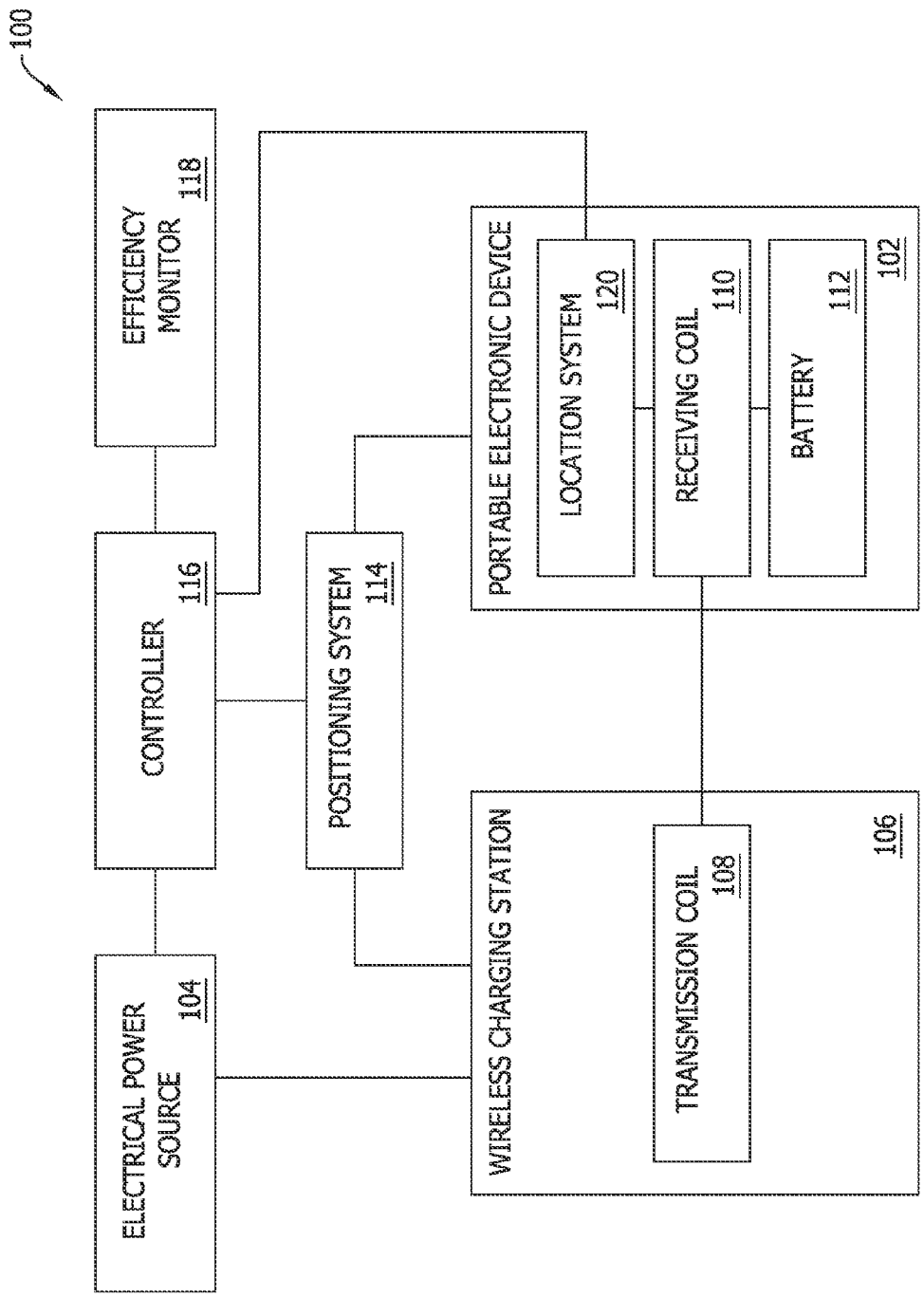
FIG. 1 is a schematic illustration of an exemplary wireless charging system that may be used to charge one or more portable electronic devices.

The methods and systems described herein provide wireless charging devices and portable electronic devices that include movable transmission and/or receiving coils. More specifically, the systems described herein enable a positioning system coupled to at least one of a receiving coil and a transmission coil to selectively rotate the receiving coil and/or transmission coil about a first axis and about a second axis to align the transmission coil with the receiving coil. In particular, rotating the transmission coil and/or the receiving coil about the first and second axes enables the transmission coil to define a first plane that is parallel with a second plane defined by the receiving coil, enabling efficient power transfer between coils.

In some embodiments, a controller is communicatively coupled with a positioning system to facilitate aligning the transmission and receiving coils. More specifically, the controller receives data indicative of the current alignment of the transmission coil and the receiving coil and instructs the positioning system to rotate at least one of the receiving coil and the transmission coil until the coils are parallel. For example, in one implementation, the controller may receive data from an efficiency monitor that measures the efficiency of power being transmitted from the transmission coil and received at the receiving coil, and controls the positioning system based on the measured efficiency. In another implementation, the controller may receive data from a location system indicative of the current position and/or orientation of the electronic device, such as an accelerometer, and controls the positioning system based on the received data. In still other embodiments, the positioning system may be manually operated such that a user can manually orient the coils to a particular position.

As used herein, an element or step recited in the singular and preceded with the word "a" or "an" should be understood as not excluding plural elements or steps, unless such exclusion is explicitly recited. Furthermore, references to one "implementation" or one "embodiment" of the subject matter described herein are not intended to be interpreted as excluding the existence of additional implementations that also incorporate the recited features. The following detailed description of implementations consistent with the principles of the disclosure refers to the accompanying drawings. In the absence of a contrary representation, the same reference numbers in different drawings may identify the same or similar elements.

As used herein, the term "translate" refers to moving an object in three-dimensional space in at least one of an X-direction, a Y-direction, and a Z-direction. As used herein, the term "orient" refers to rotating an object in three-dimensional space about an axis. For example, orienting the object refers to controlling the roll, pitch, and yaw of an object.

As used herein, the term "inductive coil" refers to any coil that transmits or receives electrical power through induction. In particular, an inductive coil may be either a receiving coil or a transmission coil.

FIG. 1 is a schematic illustration of a wireless charging system 100 that charges one or more portable electronic devices 102. In the exemplary embodiment, wireless charging system 100 includes an electrical power source 104, such as, without limitation, a wall outlet, a car battery, and/or any other device that provides electrical power, coupled to a wireless charging device 106. Wireless charging device 106 includes at least one transmission coil 108 that receives electrical power from electrical power source 104 and that transmits the electrical power to a receiving coil 110 within portable electronic device 102. In one implementation, wireless charging device 106 includes a plurality of transmission coils 108. In the exemplary embodiment, wireless charging device 106 is integral with a vehicle, such as, without limitation, an automobile, truck, car, van, aircraft, and/or boat. Alternatively wireless charging device 106 may be located anywhere that enables wireless charging system 100 to operate as described herein. Transmission coil 108 transmits electrical power to receiving coil 110, and receiving coil 110 receives the electrical power and transmits the power to a battery 112 coupled with receiving coil 110.

Further, in the exemplary embodiment, a positioning system 114 is coupled to at least one inductive coil 108 and/or 110. More specifically, positioning system 114 is integrated within at least one of wireless charging device 106 and/or portable electronic device 102, and is coupled to transmission coil 108 or receiving coil 110 respectively. In the exemplary embodiment, positioning system 114 selectively rotates and/or translates inductive coil 108 and/or 110 to facilitate substantially aligning transmission coil 108 with receiving coil 110. In one implementation, positioning system 114 has at least one joint 402 (shown in FIG. 4), for example, a spheroidal joint, a pivot joint, a hinge joint, and/or a saddle joint, that is coupled to inductive coil 108 and/or 110. The at least one joint 402 enables selective rotation of inductive coil 108 and/or 110 about a plurality of axes, for example, x-axis 314, y-axis 316, and z-axis 318 (all shown in FIG. 3).

In one embodiment, positioning system 114 selectively translates inductive coil 108 and/or 110 in at least one of an X-direction, a Y-direction, and a Z-direction. For example, positioning system 114 includes an X-axis slider (not shown), a Y-axis slider (not shown), and/or a Z-axis slider (not shown) that are each coupled to inductive coil 108 or 110. Each of the X-axis, Y-axis, and Z-axis sliders is coupled to a respective drive mechanism that selectively translates inductive coil 108 or 110. Alternatively, positioning system 114 may include any other device that facilitates selective translation of inductive coil 108 or 110.

Further, in one embodiment, wireless charging device 106 includes a plurality of transmission coils 108 that are each coupled to a plurality of respective positioning systems 114. Each positioning system 114 is configured to rotate a respective transmission coil 108 about respective first and second axes.

Moreover, in the exemplary embodiment, a controller 116 is communicatively coupled to positioning system 114. More specifically, controller 116 selectively instructs positioning system 114 to rotate and/or translate inductive coil 108 or 110. In the exemplary embodiment, controller 116 receives data indicative of a current alignment of transmission coil 108 with respect to receiving coil 110, and instructs positioning system 114 to rotate and/or translate either transmission coil 108 or receiving coil 110 based on the data. For example, in one implementation, controller 116 is coupled to efficiency monitor 118, which measures the efficiency of power transferred from transmission coil 108 to receiving coil 110. Controller 116 receives the measured power efficiency from efficiency monitor 118, and instructs positioning system 114 to rotate and/or translate inductive coil 108 or 110 based on the measured efficiency. In another implementation, controller 116 is coupled to a location system 120 within portable electronic device 102. Location system 120 includes any sensor, such as, without limitation, a Global Positioning Satellite (GPS) sensor, a 3-axes accelerometer, an electronic compass, cell triangulation system, and/or any other sensor that enables location system 120 to determine the location and/or orientation of portable electronic device 102. Location system 120 transmits the location and/or orientation of portable electronic device 102 to controller 116, which, in turn, rotates and/or translates transmission coil 108 to be aligned with receiving coil 110 based on the location and/or orientation data.

Also, in at least one embodiment, controller 116 receives data indicative of the alignment of transmission coil 108 with a plurality of receiving coils 110 from a respective plurality of portable electronic devices 102. In one such embodiment, controller 116 instructs positioning system 114 to rotate transmission coil 108 to a position that provides the highest combined power transmission efficiency between transmission coil 108 and a first portable electronic device 102 and transmission coil 108 and a second portable electronic device 102. In another implementation, positioning system 114 rotates transmission coil 108 to a position that facilitates transferring power substantially equally to each of the plurality of receiving coils 110. Alternatively, controller 116 instructs positioning system 114 to rotate transmission coil 108 into parallel alignment with one of the plurality of receiving coils 110.

Figure 2:
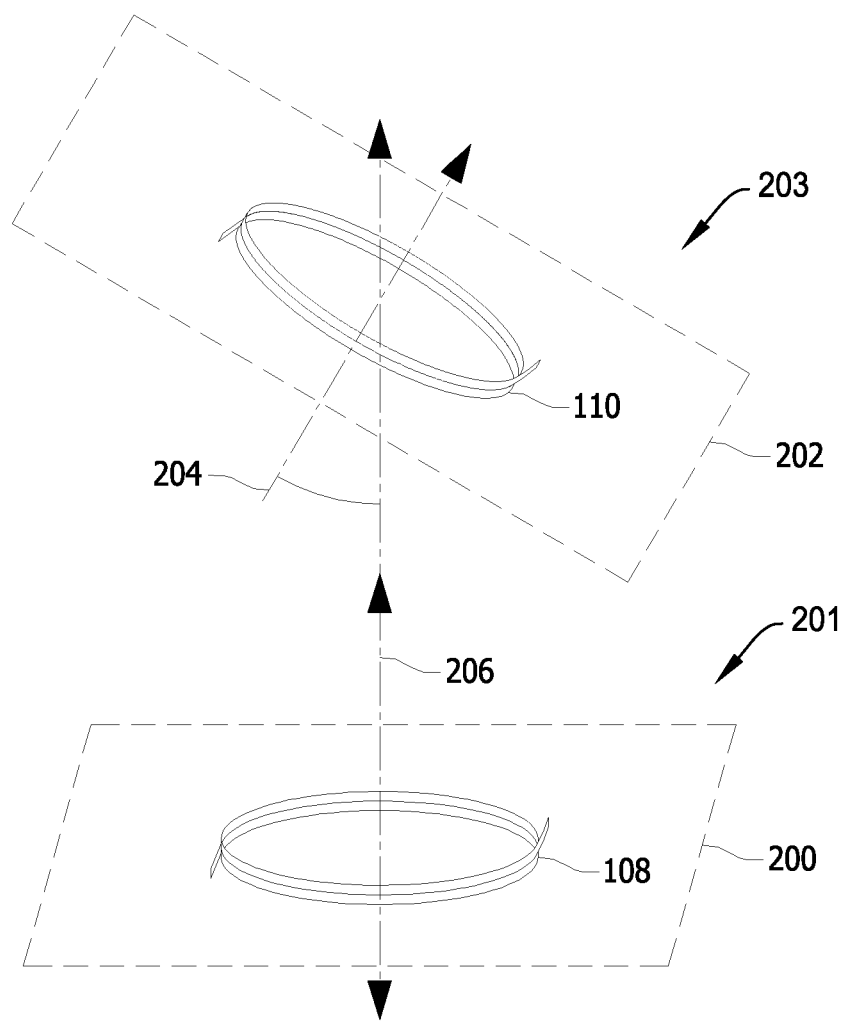
FIG. 2 is an internal view of an exemplary transmission coil and receiving coil that may be used with the wireless charging system shown in FIG. 1 at a first position.

FIG. 2 is an internal view of inductive coils 108 and 110 that may be used with wireless charging system 100 (shown in FIG. 1). More specifically, FIG. 2 illustrates transmission coil 108 in a first position 201 with respect to receiving coil 110 in a first position 203. Transmission coil 108 defines a transmission coil plane 200, and receiving coil 110 defines a receiving coil plane 202. Transmission coil plane 200 and receiving coil plane 202 define an acute angle 204 of intersection between the two planes 200, 202. Angle 204 determines the efficiency of power transfer between inductive coils 108 and 110. More specifically, a reduced angle 204 indicates inductive coils 108 and 110 are aligned closer to parallel and power transfer between inductive coils 108 and 110 is improved. In contrast, as planar angle 204 approaches ninety degrees, power transmission between inductive coils 108 and 110 approaches zero.

Figure 3:
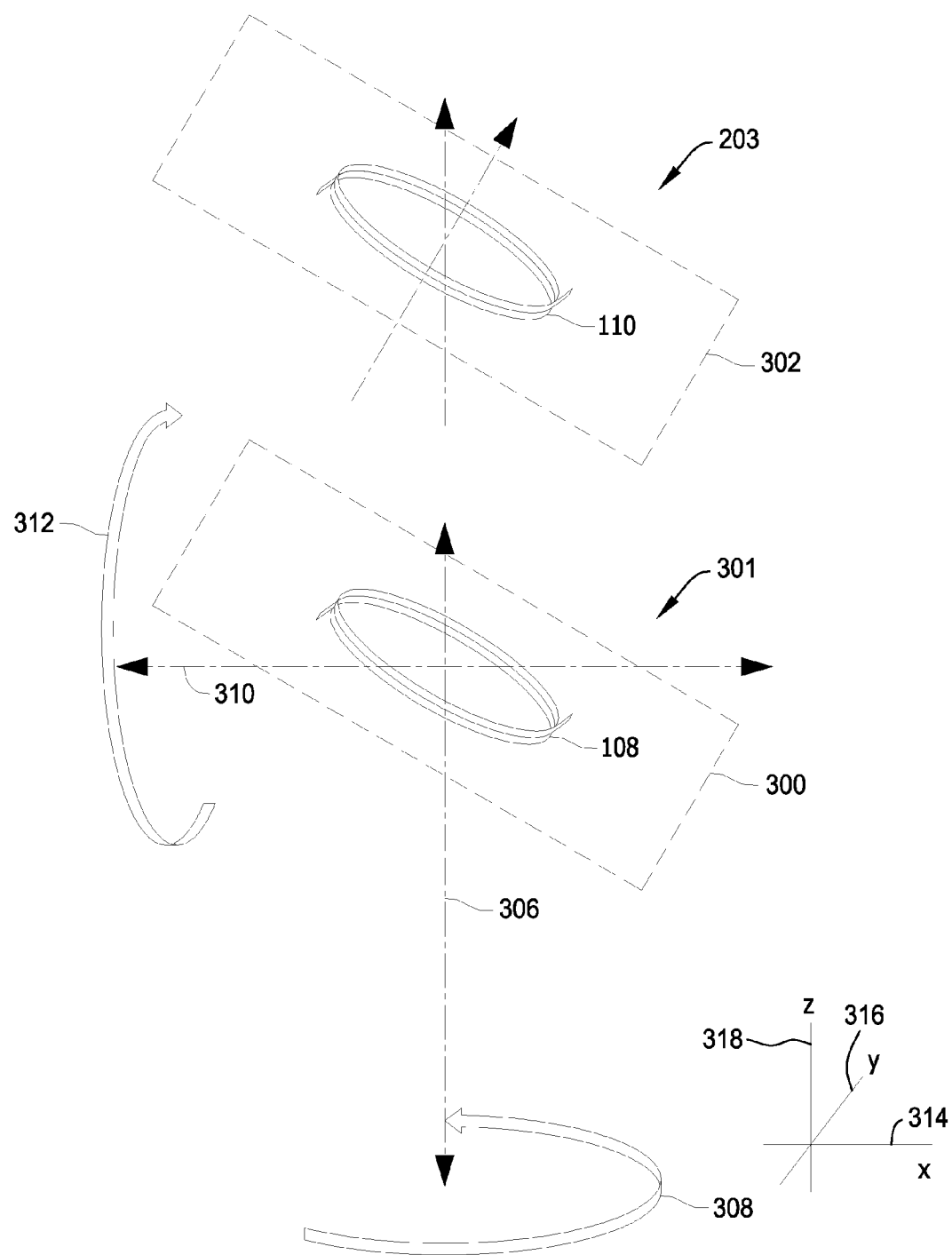
FIG. 3 is an internal view of the transmission and receiving coils shown in FIG. 2 at a second position.

FIG. 3 is an internal view of inductive coils 108 and 110 for use with wireless charging system 100 (shown in FIG. 1). More specifically, FIG. 3 illustrates transmission coil 108 at a second position 301 with respect to receiving coil 110 at the first position 203 (shown in FIG. 2). Transmission coil 108 defines a transmission coil plane 300, and receiving coil 110 defines a receiving coil plane 302. In the exemplary embodiment, positioning system 114 (shown in FIG. 1) rotates transmission coil 108 from first position 201 (shown in FIG. 2) to second position 301 by rotating transmission coil 108 about a first axis 306 as shown by arrow 308 and a second axis 310 as shown by arrow 312. In one embodiment, first axis 306 and second axis 310 may be, without limitation, the X-axis 314, Y-axis 316, Z axis 318, and/or any other axis. In one implementation, first axis 306 and second axis 310 are perpendicular to each other. Alternatively, first axis 306 and second axis 310 may be any two distinct axes. In some embodiments, positioning system 114 rotates transmission coil 108 about more than two axes to facilitate aligning transmission coil plane 300 and receiving coil plane 302. For example, positioning system 114 may rotate transmission coil 108 about each of the X-axis 314, Y-axis 316, and Z axis 318 in order to align transmission coil plane 300 with receiving coil plane 302. Once in second position 301, transmission coil plane 300 and receiver coil plane 302 are substantially parallel, i.e., angle 204 (shown in FIG. 2) is reduced.

Although described with respect to transmission coil 108, positioning system 114 could equivalently rotate receiving coil 110 such that receiving coil plane 302 is parallel with transmission coil plane 300.

Figure 4:
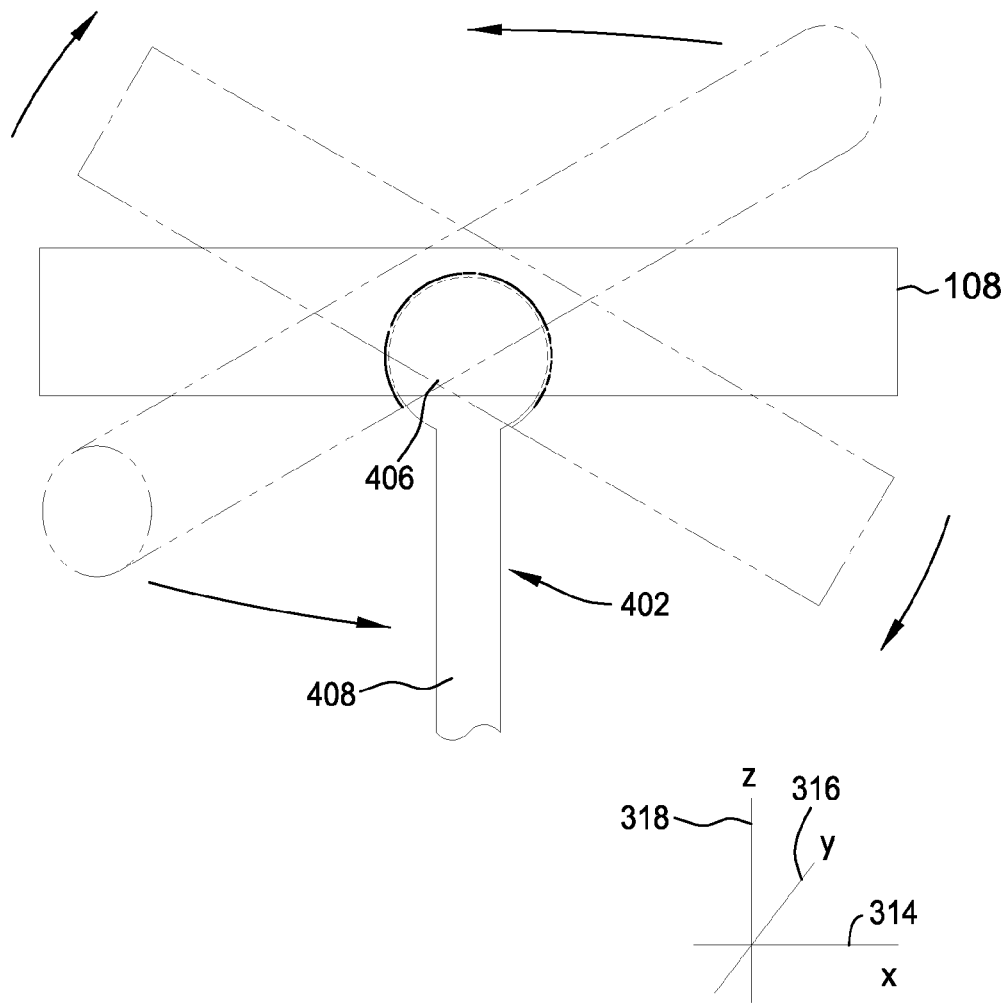
FIG. 4 is a view of an exemplary positioning system that may be used with the wireless charging system shown in FIG. 1.

FIG. 4 is a view of positioning system 114 that may be used with wireless charging system 100 (shown in FIG. 1). As described above, positioning system 114 includes at least one joint 402 that is coupled to at least one inductive coil 108 or 110. In one embodiment, joint 402 is at least one of a spheroidal joint, a pivot joint, a hinge joint, and/or a saddle joint, that enables selective rotation of inductive coil 108 and/or 110 about a plurality of axes, for example, x-axis 314, y-axis 316, and z-axis 318 (all shown in FIG. 3). In the illustrated embodiment joint 402 is a ball and socket joint that includes a ball 404 and a member 406 coupled to ball 404. Ball 404 is rotatably coupled to transmission coil 108 such that transmission coil 108 may freely rotate about a plurality of axes. Member 406 is coupled to at least one surface (not shown) within wireless charging device 106 (shown in FIG. 1). In one embodiment, joint 402 enables positioning system 114 to rotate transmission coil 108 about the plurality of axes in a serial manner, such as rotation about first axis 306 followed by rotation about second axis 310 (both shown in FIG. 3). Alternatively, or additionally, joint 402 enables positioning system 114 to rotate transmission coil 108 about first axis 306 and second axis 310 substantially simultaneously. In one embodiment, positioning system 114 also includes an X-axis slider (not shown), a Y-axis slider (not shown), and/or a Z-axis slider (not shown) that are each coupled to transmission coil 108.

In the exemplary embodiment, positioning system 114 selectively rotates and/or translates transmission coil 108 and/or 110 to facilitate substantially aligning transmission coil 108 with receiving coil 110. Although described with respect to rotating and translating transmission coil 108, positioning system 114 could equivalently rotate and translate receiving coil 110.

Figure 5:
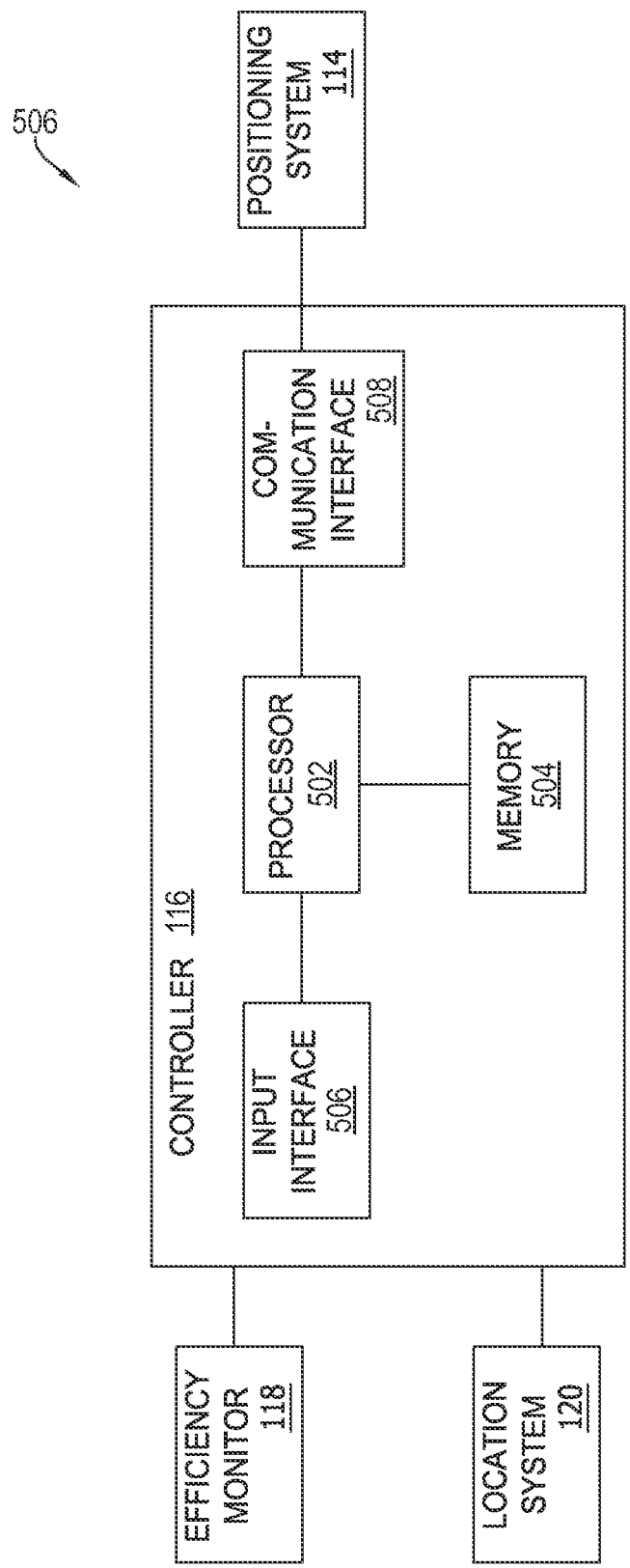
FIG. 5 is a schematic illustration of an exemplary controller that may be used with the wireless charging system shown in FIG. 1

FIG. 5 is a schematic illustration of an exemplary wireless charging control system 500 that may be included in wireless charging system 100 (shown in FIG. 1) Wireless charging control system 500 includes positioning system 114, controller 116, efficiency monitor 118, and location system 120. Controller 116 includes at least one processor 502 that is coupled to a memory device 504 for executing instructions. In some implementations, executable instructions are stored in memory device 504. In the exemplary embodiment, controller 116 performs one or more operations described herein by executing the executable instructions stored in memory device 504. For example, processor 502 may be programmed by encoding an operation as one or more executable instructions in memory device 504 and by providing the executable instructions from memory device 504 to processor 502 for execution.

Processor 502 may include one or more processing units (e.g., in a multi-core configuration). Further, processor 502 may be implemented using one or more heterogeneous processor systems in which a main processor is present with secondary processors on a single chip. In another illustrative example, processor 502 may be a symmetric multi-processor system containing multiple processors of the same type. Further, processor 502 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 504 is one or more devices that enable information, such as executable instructions and/or other data, to be stored and retrieved. Memory device 504 may include one or more computer readable media, such as, without limitation, dynamic random access memory (DRAM), static random access memory (SRAM), a solid state disk, and/or a hard disk. Memory device 504 may be configured to store, without limitation, application source code, application object code, configuration data, predefined threshold settings, measured efficiency levels, and/or any other type of data.

In the exemplary embodiment, controller 116 includes an input interface 506 that is coupled to processor 502. Input interface 306 is configured to receive input from at least one of efficiency monitor 118 and location system 120. Input interface 506 may include, for example, an antenna, a wireless data port, a wired data port, and/or any other device capable of receiving data such that the methods and systems function as described herein.

Controller 116, in the exemplary embodiment, includes a communication interface 508 coupled to processor 502. Communication interface 508 communicates with one or more devices, such as positioning system 114. To communicate with remote devices, communication interface 508 may include, for example, a wired data port, a wireless data port, an antenna, and/or or any other device capable of transmitting data such that the methods and systems function as described herein.

In operation, controller 116 receives data indicative of an alignment of transmission coil 108 and receiving coil 110 from at least one of efficiency monitor 118 and location system 120. As described in more detail below, the data is processed by processor 502, which then instructs positioning system 114 to translate and/or orient at least one of transmission coil 108 and receiving coil 110 based on the data. More specifically, in one implementation, processor 502 instructs positioning system 114 to rotate at least one of transmission coil 108 and receiving coil 110 about first axis 306 (shown in FIG. 3) and about second axis 310 (shown in FIG. 3).

Figure 6:
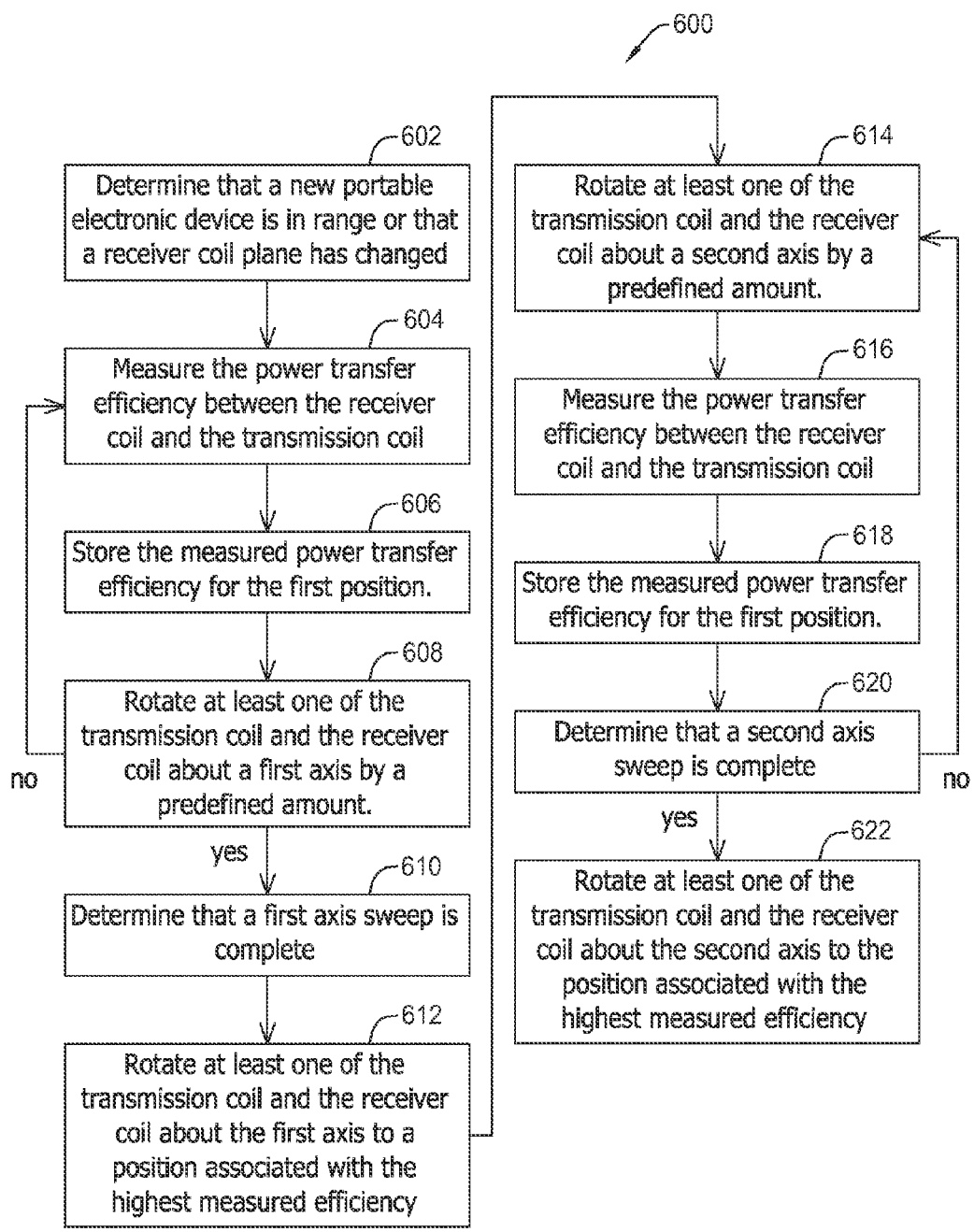
FIG. 6 is a block diagram of an exemplary process implemented by the wireless charging system shown in FIG. 1 having an efficiency monitor.

FIG. 6 is a block diagram that illustrates an exemplary process 600 implemented by wireless charging system 100 (shown in FIG. 1) having efficiency monitor 118 (shown in FIG. 1). In the exemplary embodiment, controller 116 (shown in FIG. 1) determi.nes 602 that a new portable electronic device 102 is in range to charge, and/or that receiver coil plane 202 (shown in FIG. 2) of an already charging portable electronic device 102 has changed position and/or orientation with respect to transmission coil plane 200 (shown in FIG. 2). Efficiency monitor 118 measures 604 a first power transfer efficiency between transmission coil 108 (shown in FIG. 1) and receiving coil 110 (shown in FIG. 1) at the initial position e.g., first position 201 (shown in FIG. 2). Controller 116 stores 606 the first power transfer efficiency and instructs positioning system 114 to rotate 608 inductive coil 108 and/or 110 about first axis 306 (shown in FIG. 3) by a predefined amount, e.g., without limitation, 5-10 degrees. Efficiency monitor 118 measures the new power transfer efficiency between transmission coil 108 and receiving coil 110 at the new position, and controller 116 stores the new power transfer efficiency associated with the new position.

Controller 116 iterates this process until controller 116 determines 610 that a first axis sweep is complete. More specifically, in the exemplary implementation, controller 116 determines 610 the first axis sweet is complete when inductive coil 108 and/or 110 returns to the initial position. Once the first axis sweep is complete, controller 116 instructs positioning system 114 to rotate 612 inductive coil 108 and/or 110 about first axis 306 to the position associated with the highest measured efficiency.

In another implementation, if the power transfer efficiency has improved between the initial position and the new position, controller 116 continues causing positioning system 114 to rotate inductive coil 108 and/or 110 about first axis 306 in predefined increments until the measured power efficiency decreases from one position to the next position. Once the decrease in power efficiency is detected, controller 116 selectively rotates inductive coil 108 and/or 110 in the opposite direction until the measured power efficiency iteratively decreases from one position to the next. Controller 116 then instructs positioning system 114 to rotate 612 inductive coil 108/or 110 about first axis 306 to the position associated with the highest efficiency. In at least some implementations, controller 116 may instruct positioning system 114 to rotate 612 inductive coil 108 and/or 110 by a smaller angle than the predefined angle between the last two measured positions to determine the position associated with the highest measured efficiency. Alternatively, controller 116 may determine that a sweep is complete using any other criteria, including, without limitation, a predefined time threshold, or a predefined power efficiency threshold.

Further, in the exemplary embodiment, controller 116 instructs positioning system 114 to rotate 614 inductive coil 108 and/or 110 about second axis 310 (shown in FIG. 3) by a predefined amount, e.g. without limitation 5-10 degrees, from a second axis initial position to a new position. Efficiency monitor 118 measures 616 a new power transfer efficiency between transmission coil 108 and receiving coil 110 at the new position, and controller 116 stores 418 the new power transfer efficiency.

Positioning system 114 continues to rotate 614 inductive coil 108 and/or 110 until controller 116 determines 620 that a second axis sweep is complete. More specifically, in one implementation, positioning system 114 rotates 614 inductive coil 108 and/or 110 in a first direction about second axis 310 until inductive coil 108 and/or 110 has substantially returned to the initial position about second axis 310. Once the second axis sweep is complete, controller 116 instructs positioning system 114 to rotate 422 inductive coil 108 and/or 110 about second axis 310 to the position associated with the highest measured efficiency.

In another implementation, if the power transfer efficiency has improved between the new position and the initial position controller 116 continues to rotate inductive coil 108 and/or 110 about second axis 310 in the first direction until the measured power efficiency decreases from one position to the next position. Once the decrease in power efficiency is detected, controller 116 selectively rotates 414 inductive coil 108 and/or 110 in the opposite direction until the measured power efficiency iteratively decreases from one position to the next. Controller 116 then instructs positioning system 114 to rotate 420 inductive coil 108/or 110 about first axis 306 to the position associated with the highest efficiency. In at least some implementations, positioning system 114 may rotate 420 inductive coil 108 and/or 110 between the last two measured positions about the second axis by a smaller amount than the predefined amount to facilitate rotating inductive coil 108 or 110 to the position associated with the highest measure efficiency. Alternatively, controller 116 may determine that a second axis sweep is complete using any other criteria, including, without limitation, a predefined amount of time, and/or a predefined power efficiency threshold.

Figure 7:
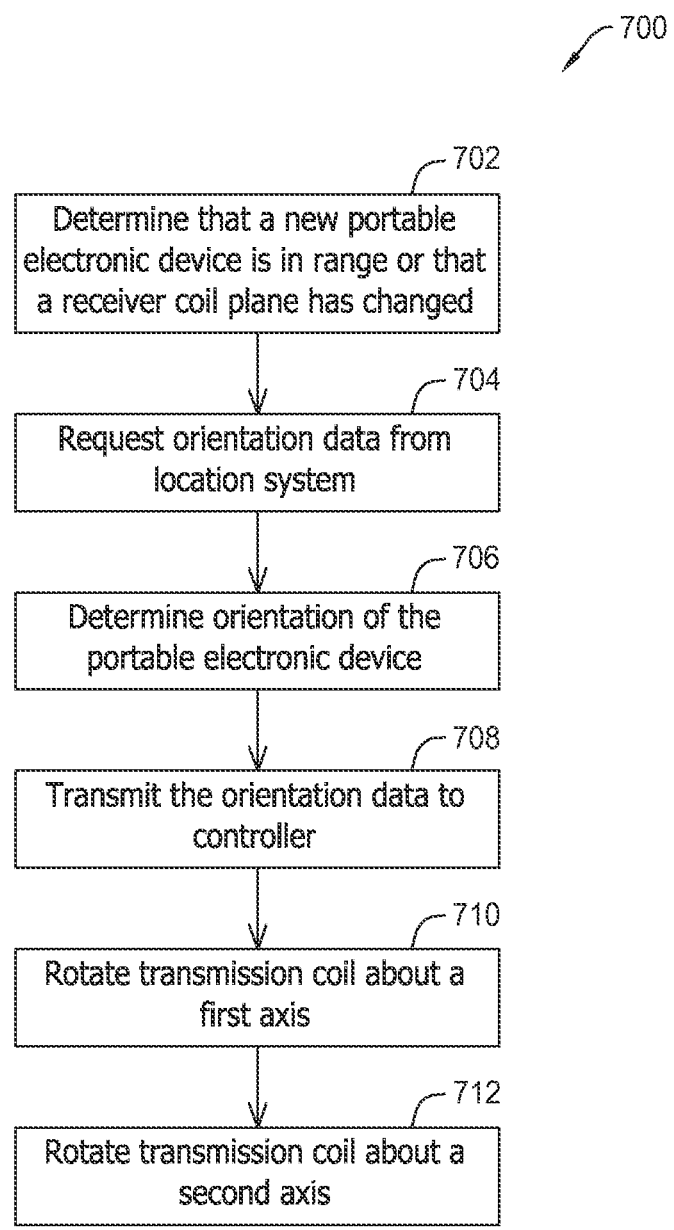
FIG. 7 is a block diagram of an exemplary process implemented by the wireless charging system shown in FIG. 1 having a location system.

FIG. 7 is a block diagram that illustrates an exemplary process 700 implemented by wireless charging system 100 (shown in FIG. 1) having location system 120 (shown in FIG. 1). In the exemplary embodiment, controller 116 determines 702 that a new portable electronic device 102 (shown in FIG. 1) is in range to charge, or that receiver coil plane 302 (shown in FIG. 3) has changed orientation with respect to transmission coil plane 300 (shown in FIG. 3). Controller 116 (shown in FIG. 1) requests 704 orientation data from location system 120 to determine the orientation of portable electronic device 102.

Location system 120 determines 706 the orientation of portable electronic device 102, and transmits 708 the orientation data to controller 116. Controller 116 processes the orientation data and instructs positioning system 114 to rotate 710 transmission coil 108 about first axis 306 (shown in FIG. 3) and rotate 712 transmission coil 108 about second axis 310 (shown in FIG. 3) based on the orientation data. More specifically, positioning system 114 rotates transmission coil 108 about first axis 306 and second axis 310 to facilitate aligning transmission coil plane 300 substantially in parallel with receiving coil plane 302. Positioning system 114 may rotate transmission coil 108 about first axis 306 and second axis 310 in any order. In some implementations, positioning system 114 rotates transmission coil 108 about first axis 306 and second axis 310 substantially simultaneously.

The above-described wireless charging system provides a positioning system coupled to at least one of a receiving coil and a transmission coil that enables at least one of the receiving coil and transmission coil to be selectively rotated about a first axis and a second axis different than the first axis. Rotating the transmission coil and/or the receiving coil about the first and second axes enables the transmission coil to define a first plane that is substantially parallel with a second plane defined by the receiving coil, thus facilitating efficient power transfer between coils. In some embodiments, a controller is communicatively coupled with the positioning system to facilitate aligning the transmission and receiving coils. More specifically, the controller receives data indicative of the current alignment of the transmission coil and the receiving coil and instructs the positioning system to rotate at least one of the receiving coil and the transmission coil to facilitate aligning the coils in parallel. The described wireless charging system enables efficiently charging a portable electronic device without manual positioning of the portable electronic device by an operator. The described wireless charging system further enables efficient charging of a portable electronic device that is not positioned substantially parallel to the wireless charging device. Moreover, the described wireless charging system enables efficient simultaneous charging of a plurality of portable electronic devices.

The methods and systems described herein may be implemented using computer programming or engineering techniques including computer software, firmware, hardware or any combination or subset thereof, wherein the technical effects may be achieved by performing at least one of the following steps: (a) transferring electrical power from an electrical power source to a transmission coil in the wireless charging device; (b) orienting the transmission coil and receiving coil to be substantially aligned with a positioning system by (i) selectively rotating at least one of the transmission coil and the receiving coil about the first axis; and (ii) selectively rotating at least one of the transmission coil and the receiving coil about the second axis; and (c) transferring electrical power from the transmission coil to a receiving coil in the portable electronic device.

Exemplary embodiments of a wireless charging system 100 are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Further, each step of any method described herein may be performed in any order. Although specific features of various embodiments may be shown in some drawings and not in others, this is for convenience only. Any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless charging device for use in providing electrical power to one or more portable electronic devices, said wireless charging device comprising:
   a transmission coil coupled to an electrical power source, wherein said transmission coil selectively transmits power from the electrical power source to at least one receiving coil in a first portable electronic device of the one or more portable electronic devices; and
   a positioning system coupled to said transmission coil, wherein said positioning system is configured to selectively rotate said transmission coil about a first axis and about a second axis.

2. The wireless charging device of claim 1 further comprising a controller communicatively coupled to said positioning system, said controller configured to:
   receive data indicative of the current alignment of said transmission coil with respect to the at least one receiving coil;
   instruct the positioning system to selectively rotate said transmission coil about the first axis at least partially based on the received data; and
   instruct the positioning system to selectively rotate said transmission coil about the second axis at least partially based on the received data.

3. The wireless charging device of claim 2 further comprising an efficiency monitor coupled to said controller, said efficiency monitor configured to:
   measure the efficiency of power transfer from said transmission coil to the at least one receiving coil; and
   transmit the measured power efficiency to said controller as data indicative of the current alignment of said transmission coil with the at least one receiving coil.

4. The wireless charging device of claim 2, wherein said controller is further configured to receive orientation data indicative of the orientation of the portable electronic device.

5. The wireless charging device of claim 2, wherein said controller receives data indicative of the alignment of said transmission coil relative to at least one receiving coil in a second portable electronic device of the one or more portable electronic devices, and instructs said positioning system to rotate said transmission coil, based on the received data, to a position that provides the highest combined power transmission efficiency between said transmission coil and said first portable electronic device and said transmission coil and said second portable electronic device.

6. The wireless charging device of claim 2, wherein said controller receives data indicative of the alignment of said transmission coil relative to at least one receiving coil in a second portable electronic device of the one or more portable electronic devices, and instructs said positioning system to rotate said transmission coil, based on the received data, to a position that provides the highest power transmission efficiency between said transmission coil and said second portable electronic device.

7. The wireless charging device of claim 1, wherein said positioning system comprises at least one of a pivot joint and a ball-and-socket joint.

8. The wireless charging device of claim 1, wherein said positioning system is further configured to selectively move the inductive coil along at least one of an X-axis, a Y-axis, and a Z-axis relative to the portable electronic device.

9. The wireless charging device of claim 1, wherein said transmission coil is integral with a vehicle.

10. A wireless charging system comprising:
one or more portable electronic devices, wherein a first portable electronic device of said one or more portable electronic devices comprising at least one receiving coil and a battery;
a wireless charging device configured to be coupled to an electrical power source and comprising a transmission coil configured to be inductively coupled to said at least one receiving coil; and
a positioning system coupled to at least one of said transmission coil and said at least one receiving coil, wherein said positioning system is configured to selectively rotate at least one of said transmission coil and said at least one receiving coil about a first axis and about a second axis.

11. The system of claim 10 further comprising a controller communicatively coupled to said positioning system, said controller configured to:
receive data indicative of the current alignment of said transmission coil with said at least one receiving coil;
instruct said positioning system to selectively rotate at least one of said transmission coil and said at least one receiving coil about the first axis at least partially based on the received data; and
instruct said positioning system to selectively rotate at least one of said transmission coil and said at least one receiving coil about the second axis at least partially based on the received data.

12. The system of claim 11 further comprising an efficiency monitor coupled to the controller, said efficiency monitor configured to:
measure the efficiency of power transferred from said transmission coil to said at least one receiving coil; and
transmit the measured power efficiency to said controller as data indicative of the current alignment of said transmission coil with said at least one receiving coil.

13. The system of claim 11, wherein said controller is further configured to receive orientation data indicative of the orientation of the portable electronic device.

14. The system of claim 11, wherein said controller receives data indicative of the alignment of said transmission coil relative to a first receiving coil in a first portable electronic device and to a second receiving coil in a second portable electronic device, and instructs said positioning system to rotate said transmission coil, based on the received data, to a position that provides the highest power transmission efficiency between said transmission coil and said second receiving coil.

15. The system of claim 11, wherein said controller receives data indicative of the alignment of said transmission coil relative to a first receiving coil in a first portable electronic device and to a second receiving coil in a second portable electronic device, and instructs said positioning system to rotate said transmission coil, based on the received data, to a position that provides the highest combined power transmission efficiency between said transmission coil and said first receiving coil and said transmission coil and said second receiving coil.

16. A method for transferring power between a wireless charging device and one or more portable electronic devices, said method comprising:
receiving electrical power from an electrical power source at a transmission coil in the wireless charging device; and
rotating, with a positioning system, at least one of the transmission coil and a receiving coil in a first portable electronic device of the one or more portable electronic devices, wherein the positioning system rotates the at least one of the transmission coil and the receiving coil by:
selectively rotating at least one of the transmission coil and the receiving coil about a first axis; and
selectively rotating at least one of the transmission coil and the receiving coil about a second axis.

17. The method of claim 16 further comprising:
receiving, by a controller communicatively coupled with the positioning system, data indicative of the current alignment of the transmission coil with respect to the receiving coil; and
selectively rotating at least one of the transmission coil and the receiving coil about the first axis and the second axis based on the received data.

18. The method of claim 17 further comprising:
measuring the efficiency of power transfer from the transmission coil to the receiving coil with an efficiency monitor; and
transmitting the measured power efficiency from the efficiency monitor to the controller as data indicative of the current alignment of the transmission coil with respect to the receiving coil.

19. The method of claim 17, wherein receiving data indicative of the alignment of the transmission coil and the receiving coil includes receiving orientation data indicative of the orientation of the portable electronic device.

20. The method of claim 16, further comprising translating the transmission coil along at least one of an X-axis, a Y-axis, and a Z-axis with respect to the portable electronic device.

* * * * *